US007523139B1

(12) United States Patent
Kemkar et al.

(10) Patent No.: US 7,523,139 B1
(45) Date of Patent: Apr. 21, 2009

(54) VOLUME SERVER AND VOLUME OWNER COMMUNICATION PROTOCOL IN A DISTRIBUTED STORAGE MANAGEMENT SYSTEM

(75) Inventors: Ankur A. Kemkar, San Jose, CA (US);
 Rajesh Bhalerao, San Jose, CA (US);
 John A. Colgrove, Los Altos, CA (US);
 Ronald S. Karr, Palo Alto, CA (US);
 Oleg Kiselev, Palo Alto, CA (US)

(73) Assignee: Symantec Operating Corporation, Cupertino, CA (US)

( * ) Notice: Subject to any disclaimer, the term of this patent is extended or adjusted under 35 U.S.C. 154(b) by 451 days.

(21) Appl. No.: 10/838,164

(22) Filed: May 3, 2004

Related U.S. Application Data

(60) Provisional application No. 60/467,645, filed on May 2, 2003.

(51) Int. Cl.
 *G06F 17/30* (2006.01)
(52) U.S. Cl. ..................................... 707/200
(58) Field of Classification Search ........................ None
 See application file for complete search history.

(56) References Cited

U.S. PATENT DOCUMENTS

| 6,038,379 | A | 3/2000 | Fletcher et al. |
| 6,044,367 | A | 3/2000 | Wolff |
| 6,820,168 | B2 | 11/2004 | Tanaka et al. |
| 2003/0172069 | A1* | 9/2003 | Uchiyama et al. ............... 707/9 |
| 2003/0177109 | A1* | 9/2003 | Cabrera et al. .................. 707/1 |
| 2004/0199720 | A1* | 10/2004 | Soejima et al. ............. 711/114 |
| 2004/0243777 | A1* | 12/2004 | Suzuki et al. ............... 711/162 |

\* cited by examiner

*Primary Examiner*—Khanh B Pham
(74) *Attorney, Agent, or Firm*—Meyertons Hood Kivlin Kowert & Goetzel, P.C.

(57) ABSTRACT

A system, method, and medium provide communication between a volume server and a volume owner in a distributed storage management system. A volume server may manage configuration information for a particular volume of storage. A volume owner may manage input/output (I/O) for the volume. The volume server may lease the configuration information to the volume owner using a communications protocol. The communications protocol comprises a plurality of operations for management of the lease. The volume owner may use the configuration information to manage the I/O for the volume.

28 Claims, 9 Drawing Sheets

VOLUME SERVER AND VOLUME OWNER COMMUNICATION PROTOCOL IN A DISTRIBUTED STORAGE MANAGEMENT SYSTEM

PRIORITY CLAIM

This application claims benefit of priority of provisional application Ser. No. 60/467,645, entitled "Asymmetric Distributed Block Virtualization in a Distributed Storage Management System," and filed on May 2, 2003.

BACKGROUND OF THE INVENTION

1. Field of the Invention

This invention is related to the field of storage management and, more particularly, to management of distributed storage resources in a network environment.

2. Description of the Related Art

Distributed network storage systems are an increasingly important part of enterprise computing systems. The storage devices used in these distributed storage systems can be many in kind and in number. In an effort to aggregate such storage devices for flexibility and ease of management, storage management techniques such as storage virtualization may be employed. Storage virtualization techniques may establish relationships between physical storage devices, e.g., disk drives, tape drives, optical drives, etc., and virtual or logical storage devices such as volumes, virtual disks, virtual logical units (virtual LUNs), etc. Virtualization techniques may provide high-level features such as clustering, backup, and other storage management techniques to aggregates of heterogeneous physical storage devices.

In the file serving and network storage environments, two trends are emerging. The first trend is a movement away from storage being directly attached to servers and towards storage being network attached. In some configurations, this network-attached storage may be directly accessible by clients. Enterprise computing systems are increasingly using configurations such as computer clusters, Storage Area Networks (SANs), Network Attached Storage (NAS), and other centralized storage mechanisms to simplify storage, improve availability, and handle escalating demands for data and applications.

The second trend is a movement away from deploying expensive high end servers towards deploying server appliances which include an aggregation of inexpensive server modules. These server modules are typically not of very high capacity, but the appliance can be scaled to meet the performance requirements by aggregating multiple such modules. Customers may start with a configuration which meets their current requirements and later add capacity as needed.

Clustering may be defined as the use of multiple computers (e.g., PCs or UNIX workstations), multiple storage devices, and redundant interconnections to form what appears to external users as a single and highly available system. Clustering may be used for load balancing and parallel processing as well as for high availability.

The storage area network (SAN) model places storage on its own dedicated network, removing data storage from the main user network. This dedicated network most commonly uses Fibre Channel technology as a versatile, high-speed transport. The SAN includes one or more hosts that provide a point of interface with LAN users, as well as (in the case of large SANs) one or more fabric switches, SAN hubs and other devices to accommodate a large number of storage devices. The hardware (e.g. fabric switches, hubs, bridges, routers, cables, etc.) that connects workstations and servers to storage devices in a SAN is referred to as a "disk fabric" or "fabric." The SAN fabric may enable server-to-storage device connectivity through Fibre Channel switching technology to a wide range of servers and storage devices.

The versatility of the SAN model enables organizations to perform tasks that were previously difficult to implement, such as LAN-free and server-free tape backup, storage leasing, and full-motion video services. SAN deployment promises numerous advantages, including cost management through storage consolidation, higher availability of data, better performance and seamless management of online and offline data. In addition, the LAN is relieved of the overhead of disk access and tape backup, data availability becomes less server-dependent, and downtime incurred by service and maintenance tasks affects more granular portions of the available storage system.

For distributed storage management, unique naming of the devices under administration is a critical feature. An existing approach uses a unique disk identifier (UDID) which is generated via a combination of inquiry and mode data from the disk. Typically, UDIDs are not dependent on the connectivity of the device. A well-known UDID generation algorithm may ensure that the UDID generation can be performed in a decentralized way and will always yield the same UDID for a given device. However, the length of UDIDs may render them difficult to read and user-unfriendly. Due to their length, UDIDs are not appropriate for use in graphical user interfaces (GUIs), command-line interfaces (CLIs), error messages, and other contexts where user-friendliness is at a premium.

Another existing approach generates Enclosure Based Names (EBN) based on information within an enclosure. The names of enclosures are persistently stored on the host, and a virtual LUN serial number is generated every time a device is discovered. Each time device discovery takes place, the same device may get a different virtual LUN serial number and enclosure based name. Furthermore, these names are not guaranteed to be unique across multiple hosts.

SUMMARY OF THE INVENTION

Various embodiments of a system, method, and medium described herein may provide communication between a volume server and a volume owner in a distributed storage management system. A volume server may manage configuration information for a particular volume of storage. A volume owner may manage input/output (I/O) for the volume. The volume server may lease the configuration information to the volume owner using a communications protocol. The communications protocol comprises a plurality of operations for management of the lease. The volume owner may use the configuration information to manage the I/O for the volume.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the systems, methods, and media described herein may provide management of distributed storage resources in a networked computer environment. In various embodiments, the components that implement storage management may be distributed in different ways and implemented in different types of network storage systems. For example, the storage management may be performed in a SAN-based network storage system including a client/server-based architecture for volume-level sharing available. The storage management may include storage virtualization. The storage management may be performed in a switch-based network storage system. Although particular embodiments may be discussed in this specification through examples of specific distributed storage architectures (e.g., FIGS. 1 through 4), storage management techniques may alternatively be performed in other types of network storage systems.

As used herein, a "block device" comprises a hardware or software entity that provides a collection of linearly addressed blocks of uniform size that can be read or written. A block device differs from a file in that it does not require use of a file system, and is typically less dynamic. A block device presented by an operating system presents relatively few primitives: open, close, read, write, plus a few miscellaneous control and query primitives. File systems provide a richer set of primitives, including support for creating and removing files, appending to files, creating and removing directories, etc. Typical interfaces to block devices also allow for higher raw throughput and greater concurrency than typical interfaces to single files of a file system. Block devices residing on hardware devices typically present some form of SCSI interface, though other interfaces are possible.

A basic block device comprises a simple array of blocks. The prototypical block device is a single disk drive presenting all of its sectors as an indexed array blocks. Disk arrays and volume managers introduce virtualization of blocks, creating some number of virtual block devices. In block virtualization, one or more layers of software and/or hardware rearrange blocks from one or more disks, add various kinds of functions, and present the aggregation to a layer above as if it were essentially a collection of basic disk drives (i.e., presenting the more complex structure as if it were simple arrays of blocks). Block virtualization can add aggregation (striping and spanning), mirroring and other forms of redundancy, some performance optimizations, snapshots, replication, and various capabilities for online reorganization. Block virtualization provides all these capabilities without affecting the structure of the file systems and applications that use them.

As used herein, a "logical volume" comprises a virtualized block device that is presented directly for use by a file system, database, or other applications that can directly use block devices. This differs from block devices implemented in hardware devices, or below system disk drivers, in that those devices do not present a direct system device that can be opened for direct use. Instead, a system-dependent disk driver must be used to access the device. That disk driver is generally unaware of the virtualization and forms a barrier that makes it more difficult to use some amounts of file system and application interaction to make some features (such as snapshots) work better.

As used herein, a "logical or physical disk [drive]" (also referred to as a "physical volume") comprises a disk drive (physical) or a device (logical) presented by a hardware block virtualizer to look like a disk drive. Disk arrays present logical disks. Virtualizing host bus adapters and many virtualizing switches also present logical disks. Upper layers of virtualization typically run on top of logical disks.

Distributed block virtualization may distribute a description of how a virtual block device (for example, a logical volume or a virtual LUN) relates to underlying storage, as well as how distributed block virtualization components might relate in order to accomplish certain functions. As used herein, "distributed [block] virtualization" typically refers to what is commonly called "out-of-band" virtualization. Block virtualization is basically the concept of defining a more complex structure between a consumer of a block device and the underlying block storage. The block device presented is often called a logical volume. Distributed block virtualization communicates that structure between systems so that several systems can share parts of underlying storage that is managed above by a virtualizer, and so that the implementation of some of the block virtualization operations can be distributed and coordinated.

Figure 1:
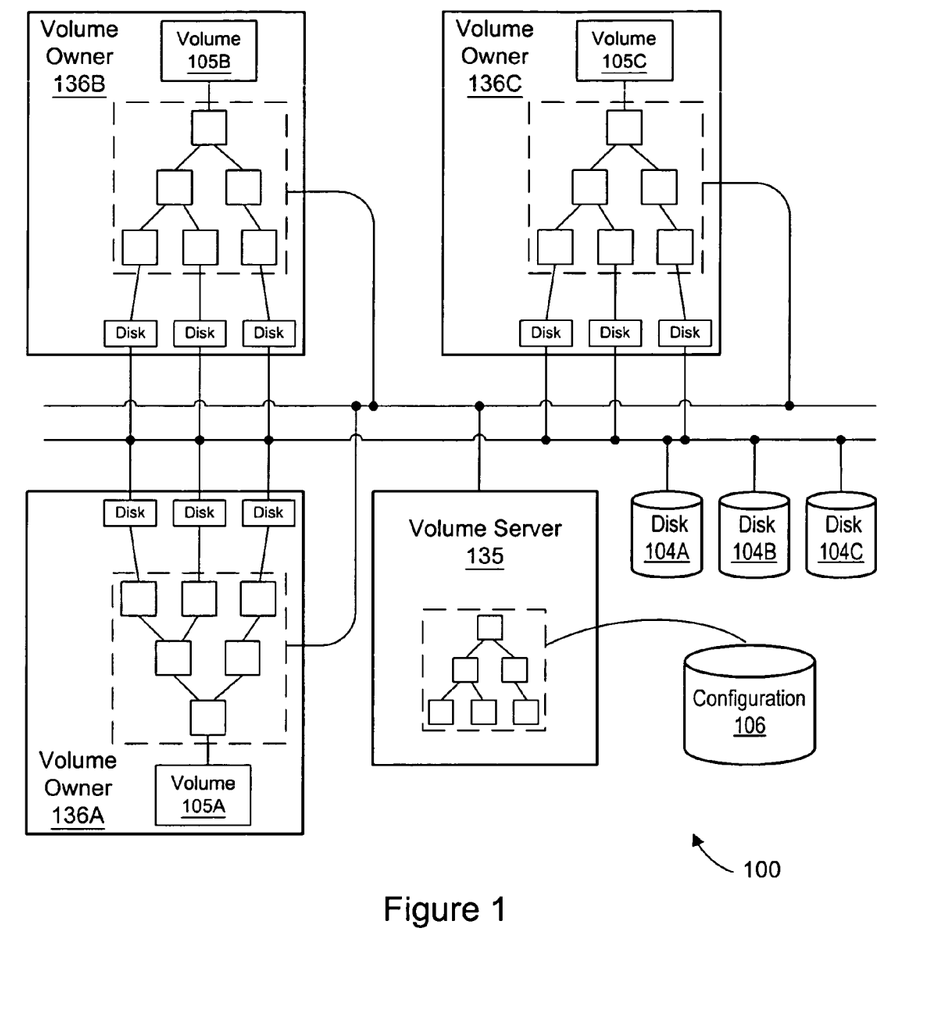
FIG. 1 illustrates an exemplary network computing environment in which embodiments of a system and method for distributed storage management may be implemented.

FIG. 1 illustrates a logical volume-based block virtualization system 100 according to one embodiment. A volume server 135 (also referred to herein as a virtualization coordinator) may provide functions such as configuration management and distributed virtualization coordination. The volume server 135 reads and updates configuration information from a configuration database 106. The configuration information in the database 106 establishes the logical configuration of data on the physical storage devices 104 (e.g., disks 104A, 104B, and 104C). In one embodiment, the configuration information is stored on the disks (e.g., disks 104A, 104B, and 104C) that are being virtualized.

The logical configuration for a single volume (e.g., volume 105A, 105B, or 105C) is depicted in FIG. 1 as a tree of virtual objects. The tree is coherently communicated and updated to all the nodes that share access to that volume (e.g., volume 105A, 105B, or 105C). Each node can then independently use that tree of virtual objects to transform the I/O stream coming into the I/O engine on that node into I/O requests directly to the physical disks (e.g., disks 104A, 104B, and 104C) that underlie the volume (e.g., volume 105A, 105B, or 105C).

In one embodiment, another software component (referred to as a log coordinator) may coordinate some storage management functions. For example, the log coordinator may coordinate update activity associated with recoverable mirroring and snapshots. Other components may coordinate specific functions within the distributed storage management system and method.

Figure 2:
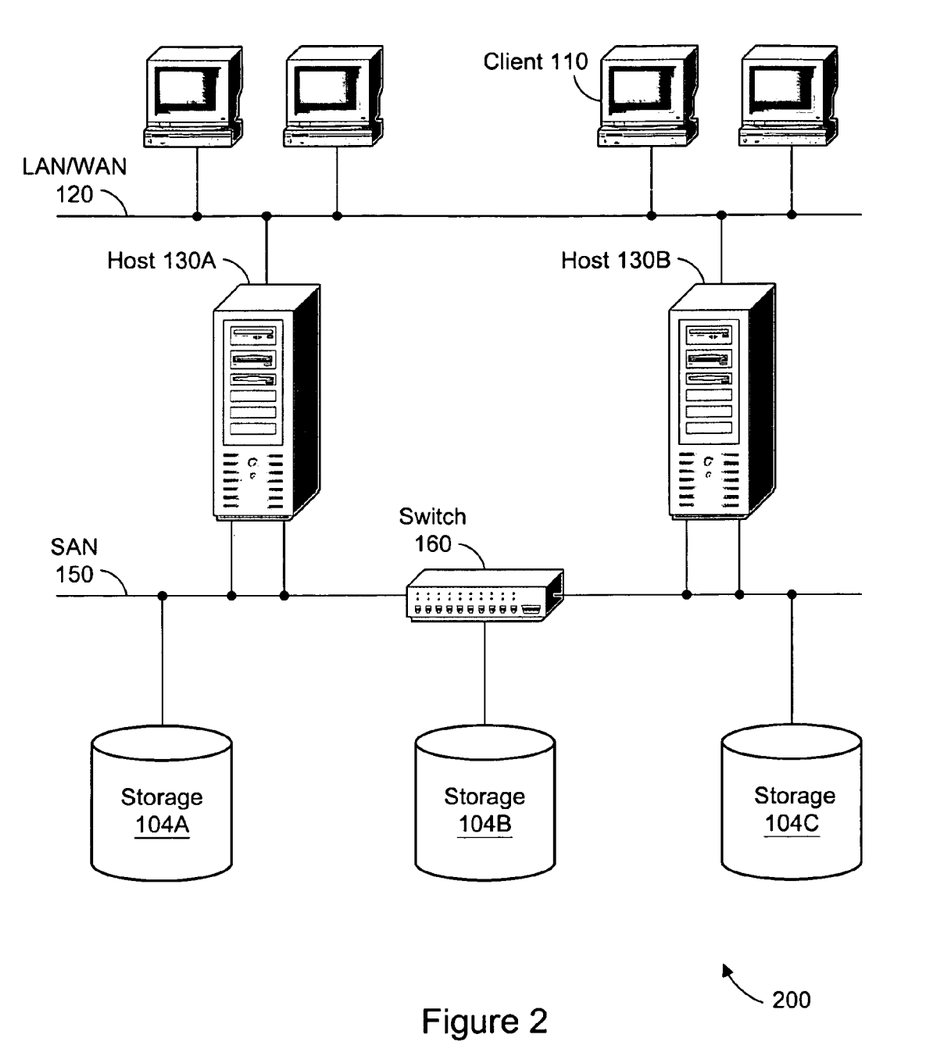
FIG. 2 illustrates an exemplary network computing environment, including host-based storage virtualization, in which embodiments of a system and method for distributed storage management may be implemented.
Figure 3:
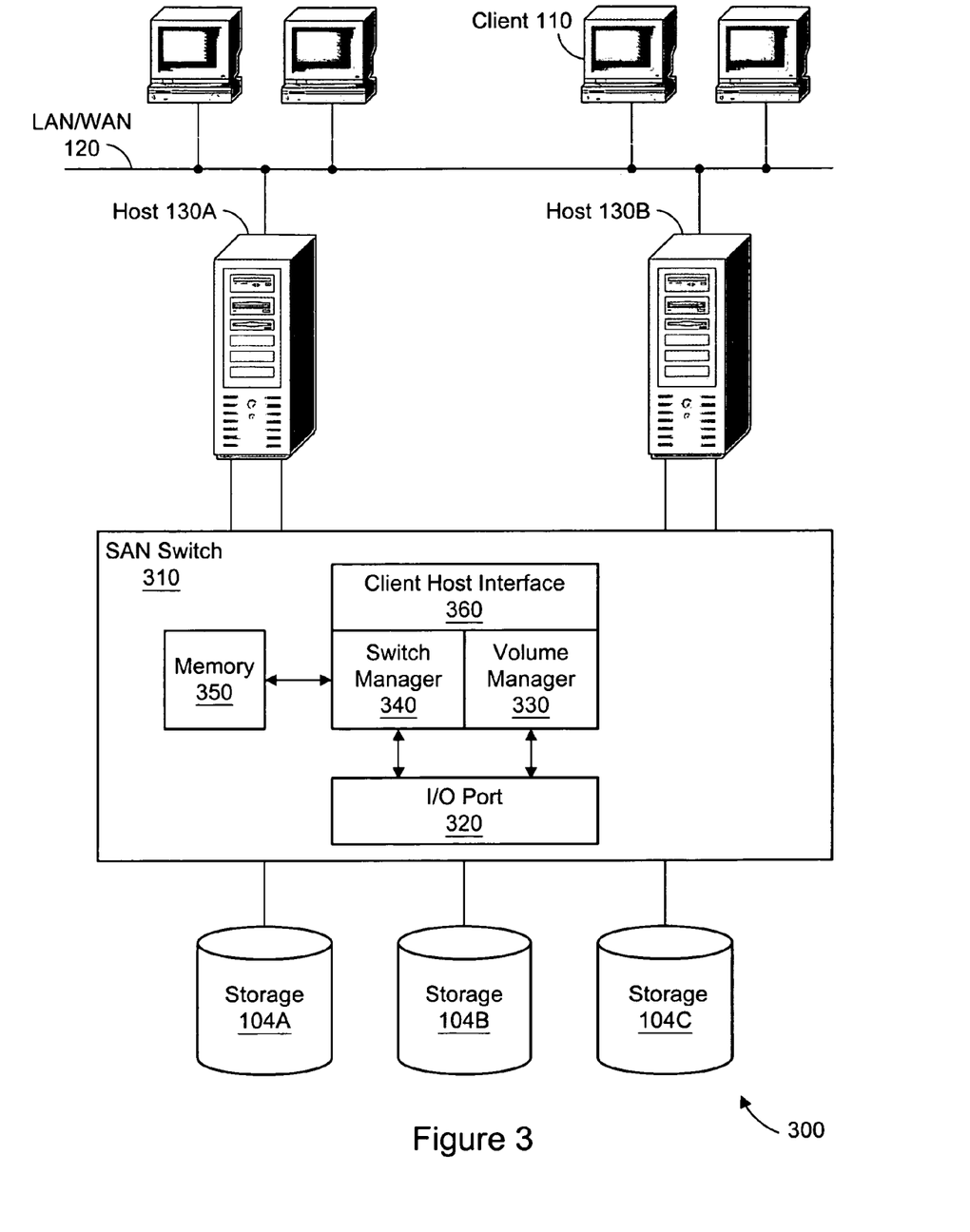
FIG. 3 illustrates an exemplary network computing environment, including switch-based storage virtualization, in which embodiments of a system and method for distributed storage management may be implemented.
Figure 4:
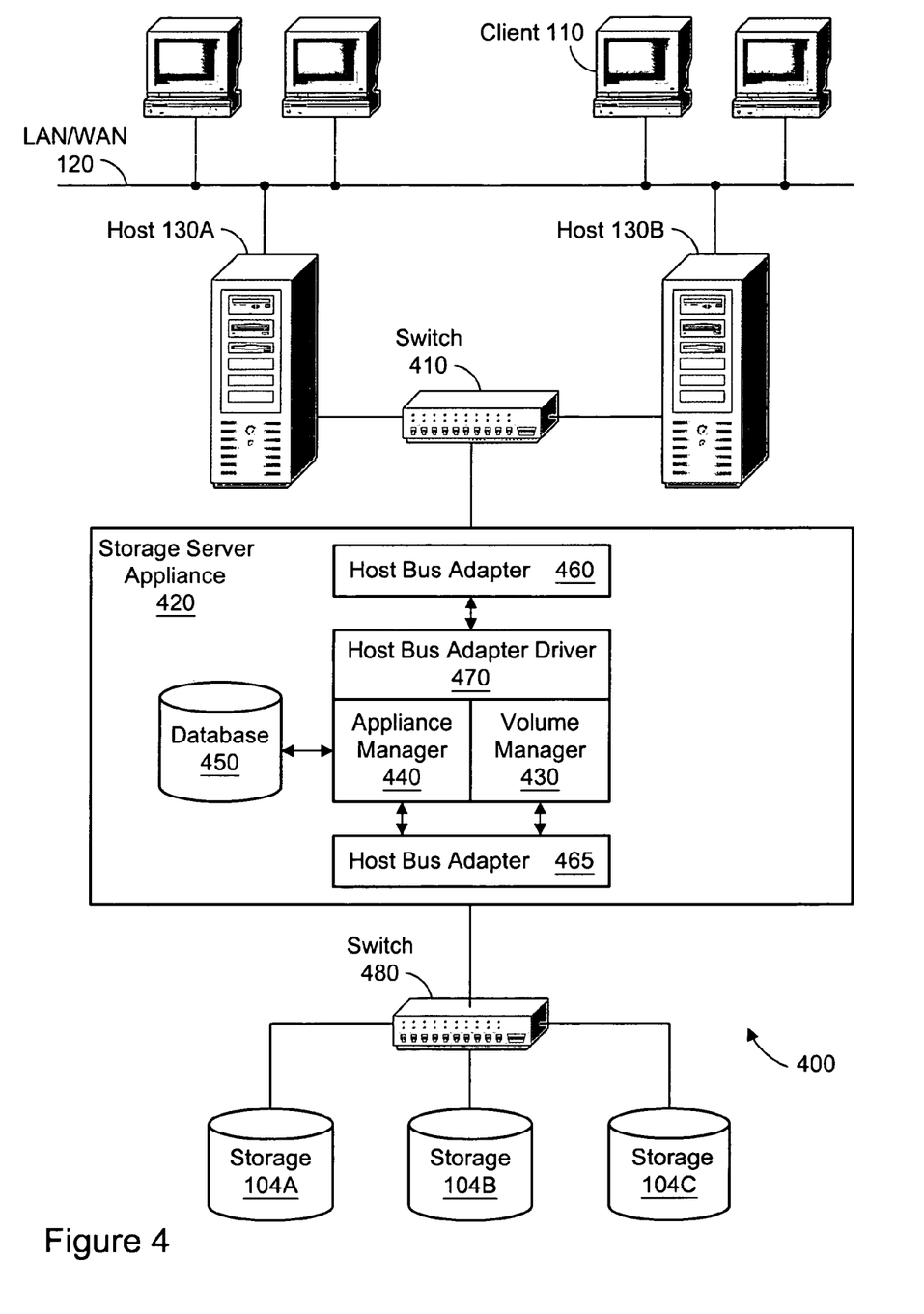
FIG. 4 illustrates an exemplary network computing environment, including appliance-based storage virtualization, in which embodiments of a system and method for distributed storage management may be implemented.

In various embodiments, storage management components (i.e., components that implement storage management techniques) may reside in various places. FIGS. 2 through 4 illustrates examples of architectures in which storage management techniques may be employed. The storage management components may include software layers on servers (e.g., that run file systems or databases). They may include disk arrays. They may include intermediate devices residing in storage networks between hosts and disk arrays. They may include host bus adapters that connect a host to a network. Components can cooperate to provide storage management either across a layer or between layers, or layered components can implement isolated virtualization layers where a higher layer uses a lower layer in the same way the upper layer would simply use a disk drive.

A typical implementation of distributed storage management including storage virtualization may include components running on some collection of nodes to identify and organize some collection of underlying logical disks. Additionally, configuration management components may store and retrieve information that describes the logical structure associated with the virtualization (e.g., how logical and physical disks are divided, aggregated, mirrored, and so on). Various distributed virtualization coordination components analyze the logical structure and communicate information about that structure to the various I/O engines that receive and transform read and write requests (the incoming I/O stream) to virtual block devices and convert them into network messages and reads and writes to underlying logical and physical disk drives.

The configuration associated with a virtual block device may change over time, such as to add or remove mirrors; migrate data to new storage; increase or decrease the size of the device; create, manipulate, or remove snapshots; add structure for a new capability; etc. Changes that affect several I/O engines must often result in coherent updates that are effectively atomic relative to some aspect of the I/O stream. These changes may generally be done through some kind of distributed transactional update, coupled with some form of I/O quiesce, which temporarily blocks activity while distributed structures are updated.

Figure 5:
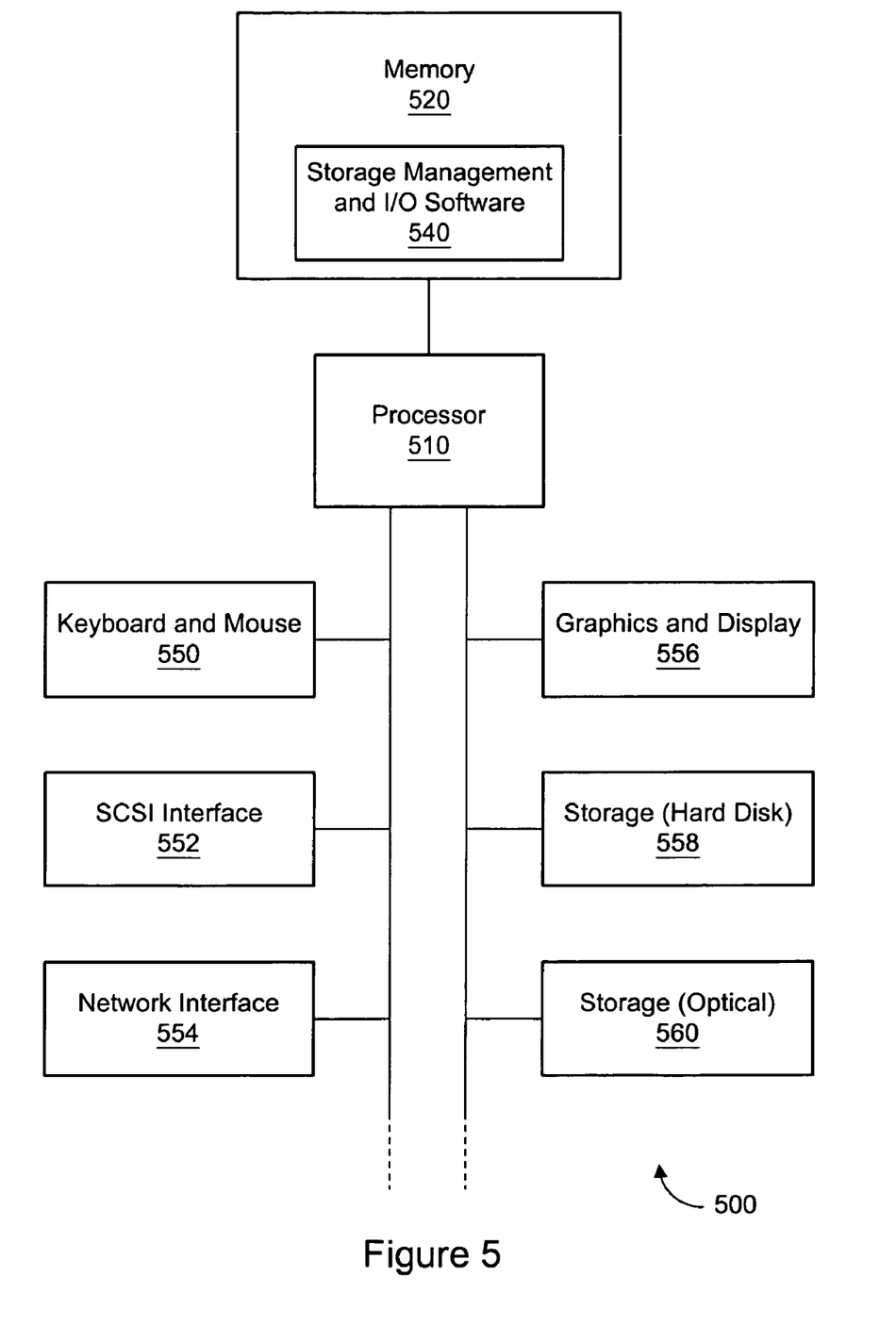
FIG. 5 illustrates components of an exemplary computer system with which embodiments of a system and method for distributed storage management may be implemented.

FIG. 2 illustrates an example of a computing system 200 according to one embodiment. The members of the computing system 200 may include one or more hosts 130 such as host 130A and host 130B. As members of computing system 200, hosts 130A and 130B, typically some type of application, data, or file server, may be referred to "nodes." Hosts 130A and 130B may operate independently of each other, or they may interoperate to form some manner of cluster. Hosts 130A and 130B are typically individual computer systems having some or all of the software and hardware components well known to those having skill in the art. FIG. 5 (described below) illustrates some of the features common to such computer systems. In support of various applications and operations, hosts 130A and 130B may exchange data over various communication links, for example, network 120, typically a local area network (LAN), e.g., an enterprise-wide intranet, or a wide area network (WAN) such as the Internet. Additionally, network 120 provides a communication path for various client computer systems 110 to communicate with hosts 130A and 130B. In addition to network 120, hosts 130A and 130B may communicate with each other over a private network (not shown) in one embodiment.

Other elements of computing system 200 may include a storage area network (SAN) 150, SAN switch 160, and storage devices 104. Storage devices (e.g., 104A, 104B, and 104C) may include various devices such as a tape library (typically including one or more tape drives), a group of disk drives (i.e., "just a bunch of disks" or "JBOD"), an intelligent storage array, and other suitable storage means. As shown in FIG. 2, both hosts 130A and 130B are coupled to SAN 150. SAN 150 is conventionally a high-speed network that allows the establishment of direct connections between storage devices 104 and hosts 130A and 130B. Thus, SAN 150 is shared between the hosts and allows for the sharing of storage devices between the hosts to provide greater availability and reliability of storage.

Although hosts 130A and 130B are shown connected to storage devices 104A, 104B, and 104C through SAN switch 160 and SAN 150, this need not be the case. Shared resources may be directly connected to some or all of the hosts in the computing system, and computing system 200 need not include a SAN. Alternatively, hosts 130A and 130B can be connected to multiple SANs. Additionally, SAN switch 160 can be replaced with a SAN router, a SAN hub, or some type of storage appliance.

In various embodiments, the storage management technique of storage virtualization can generally be implemented at the host level, e.g., hosts 130A and 130B, at the storage device level, e.g., intelligent disk array 190, and/or at the appliance level, e.g., SAN switch 160. Host-based storage virtualization is perhaps the most common virtualization solution and is typically either packaged with the host's operating system or made available as an add-on product. Host-based virtualization may allow administrators to access advanced storage management functions such as mirroring, RAID sets, redundant pathing, and hot backups (by using mirror splits or snap-shots). However, host-based virtualization may add undesirable overhead to the host system. Furthermore, host-based virtualization may complicate global storage management by requiring management on a host-by-host basis.

Storage-based virtualization may provide an alternative to host-based virtualization in various embodiments. Storage-based virtualization solutions typically implement intelligent storage devices such as intelligent disk arrays that implement virtualization functions. For example, such devices can allow for movement between different RAID groups without data loss, as well as automatic migration of data from one RAID group to another based upon the frequency of data access. In addition, these products typically permit the creation of multiple data mirrors, which provide additional availability when one of the mirrors is split for hot backups. Storage-based virtualization can also be advantageous in providing the flexibility to modify LUN (logical unit) size, the ability to have multiple hosts see the same LUNs (which is particularly critical with high availability clustering), and remote replication. However, the more heterogeneous the storage devices, the more likely it is that there are multiple virtualization schemes with which a host-level or client-computer-system level application or user will have to contend.

Still another alternative is appliance-based virtualization. Appliance-based virtualization provides users with virtualization between the hosts and the storage, allowing for the same level of control and centralization across the storage architecture. There are generally two kinds of appliance-based virtualization products: in-band and out-of-band. An in-band virtualization appliance is physically located between the host and the storage. The appliance takes the disk requests from the host and fulfills the host's request from the storage attached to the other side of the appliance. This functionality is essentially transparent to the host because the appliance presents itself as disk. The physical location of the appliance is the primary difference between out-of-band and in-band appliances. Out-of-band appliances logically present themselves as if they are located between the host and storage, but they actually reside to the side. This is accomplished with the installation of a driver under the host's disk driver. The appliance driver then receives logical to physical block mappings from the appliance. In providing a common virtualization scheme for all storage devices 104, appliance-based virtualization may simplify the presentation and use of virtual storage devices by client computer systems 110.

FIG. 3 illustrates an example of a computing system 300 according to one embodiment. In the example of FIG. 3, computing system 300 includes two hosts 130A and 130B. Both hosts 130A and 130B execute one or more application programs respectively. Such applications can include, but are not limited to, database administration systems (DBMS), file servers, application servers, web servers, backup and restore software, customer relationship management software, and the like. The applications and other software not shown, e.g., operating systems, file systems, and applications executing on client computer systems 110 can initiate or request I/O operations against storage devices 104. These I/O operations typically include read and write operations to logical or virtual devices such as volumes, virtual LUNs, and/or virtual disks designed to appear and operate as SCSI LUNs.

SAN switch 310 is an example of a storage appliance that can implement the systems and methods described herein. Other devices that can be utilized include a variety of devices such as general network switches, switch-routers, routers, router-switches and other storage network devices. The term "switch" is used in this specification to describe equipment used to direct information over a network based on address information. Those skilled in the art will understand that such equipment includes, for example, switches and routers. SAN switch 310 is responsible for creating and managing the virtualization of storage devices 104A, 104B, and 104C. In one example, SAN switch 310 presents the virtual disks to host 130, host 140, and client computer systems 110.

In support of the virtualization scheme, SAN switch 310 may include a volume manager 330, switch manager 340, client host interface 360, memory 350, and I/O port 320. Although only one I/O port is illustrated, SAN switch 310 typically includes multiple I/O ports, e.g., at least one port for each device attached to the switch. Moreover, the elements shown are merely illustrative, and those having ordinary skill in the are will recognize a variety of other architectures that can be used. For example, each port can have one or more associated processors for executing software performing volume manager 330, switch manager 340, and client host interface 360 functionality. Data can be transmitted among ports using a switching fabric (not shown) implementing a cross-bar, single-bus, multiple-bus, or shared-memory architecture. Additionally, volume manager 330, switch manager 340, and client host interface 360 are each typically implemented as software, microcode, or some combination of the two executing on a general-purpose microprocessor, general-purpose microcontroller, ASIC, PLD, FPGA, or the like. In this manner, the hardware and/or software operates as an I/O processor. In some embodiments, the functionality of two or more of volume manager 330, switch manager 340, and client host interface 360 is implemented in the same software and/or hardware. For example, volume manager 330 and switch manager 340 might be combined into a single software package. Additionally, there can me more than one instantiation of each of volume manager 330, switch manager 340, and client host interface 360 in some implementations.

Volume manager 330 enables physical resources configured in the computing system to be managed as logical devices. An example of software that performs some or all of the functions of volume manager 330 is the VERITAS Volume Manager™ product provided by VERITAS Software Corporation. While volume manager 330 organizes storage devices 104A, 104B, and 104C into one or more volumes, switch manager 340 is responsible for presenting one or more volumes as one or more virtual disks. In one example, there is a one-to-one correspondence between volumes and virtual disks; however, other mappings may be used as well.

In one embodiment, switch manager 340 maintains SAN switch 310 data objects such as access control lists, quality of service information, virtual disk information and route information. Some or all of the information maintained by switch manager 340 can be stored in memory 350, which can be a disk drive, a random access memory, a flash memory, or some other suitable storage medium. A virtual disk may be created by defining its SCSI characteristics and its mapping to a volume established by volume manager 330. SCSI characteristics may include block size, device size, inquiry data, and mode pages. In one embodiment, the virtual disk is a computing system wide entity in that its definition does not bind it to any specific appliance node. A route to the device can also be created. In general, a route binds a virtual disk to a specific LUN on a specific port. Switch manager 340 receives and processes one or more I/O interface commands (e.g., SCSI commands), as part of its virtual disk maintenance functionality.

A SCSI target device contains one or more logical units (LUNs) and target ports (sometimes referred to as targets) and receives device service and task management requests for processing. A logical unit is an externally addressable entity within a target that implements a SCSI device model and contains a device server. A device server is an object within a logical unit that executes SCSI tasks according to the rules of task management. Devices which comply with SCSI standards may include: direct access devices, sequential access devices, printer devices, processor devices, write once read multiple devices, magnetic storage devices, compact disk (CD) devices, scanner devices, optical memory devices, media changer devices, communication devices, storage array devices, enclosure services devices, router devices, storage appliances, and simplified direct-access devices. The aforementioned devices may be used as shared resources and shared data resources.

Switch manager 340 may utilize volume information from volume manager 330 and store it along with the information it maintains in memory 350. For example, since volume manager 330 is typically responsible for creating and maintaining snapshot volumes, it can provide information about a snapshot volume to switch manager 340. Switch manager 340 in turn stores the information in a way that is accessible using one or more I/O interface commands. For example, switch manager 340 includes the virtual device information from volume manager 330 in inquiry data that is accessible using the SCSI-3 INQUIRY command. In this way, additional information about the virtual disks and their related volumes is made accessible to hosts 130A and 130B as well as client computer systems 110. For example, an application operating on host 130, e.g., a backup and restoration application, can query SAN switch 310 using a SCSI-3 INQUIRY to gather information about the relationship among virtual disks and/or corresponding volumes.

Client host interface 360 provides a user interface, e.g., a command line interface or a graphical user interface, for the management of volume manager 330, switch manager 340, and/or other features of SAN switch 310. Additionally, client host interface 360 can serve as an additional interface for accessing and/or modifying information stored in memory 350, such as the aforementioned virtual device information.

FIG. 4 illustrates an embodiment in which storage virtualization is maintained by a storage server appliance 420. In general, storage server appliance 420 differs from SAN switch 310 in that SAN switch 310 is a specialized piece of hardware, while storage server appliance 420 is typically a conventional computer system, e.g., a server, that operates additional software to provide storage server appliance functionality. An example of the type of software used to provide such functionality on conventional server hardware is the VERITAS ServPoint™ Appliance Software for SAN product provided by VERITAS Software Corporation. To enhance storage server appliance 420's integration with computing system 400, e.g., to provide additional virtualization information to applications executing on hosts 130A and 130B, the systems, methods, and software of the present invention can be utilized.

Computing system 400 may utilize two switches 410 and 480 to provide front side and back side storage networks. Switch 480 links all of the storage devices 104A, 104B, and 104C to the storage server appliance 420. Similarly, switch 410 links all of the storage clients, e.g., hosts 130A and 130B, to storage server appliance 420. For added fault tolerance, multiple switches and data paths can be used as is well known to those having ordinary skill in the art.

Switch 410 is coupled to host bus adapter 460 of storage server appliance 420. Host bus adapter 460 is typically a SCSI or Fibre Channel adapter supporting a high speed/bandwidth connection. Host bus adapter driver 470 supports I/O operations from storage clients, and interface with appliance manager 440 and volume manager 430. In general, appliance manager 440 and volume manager 430 operate in much the same manner as switch manager 340 and volume manager 330. In particular, appliance manager 440 maintains data objects such as access control lists, quality of service information, virtual disk information (including the specialized information described above) and route information. Such information is stored in database 450, which is typically stored on one or more disk drives local to storage server appliance 420. In this manner, certain hardware and/or software of storage server appliance 420 may operate as an I/O processor.

The systems and methods described above are typically implemented as one or more software programs for a computer system, wherein the software programs are encoded in a computer readable medium as instructions executable on one or more processors. The computer readable medium can be any one of an electronic storage medium, a magnetic storage medium, an optical storage medium, and a communications medium conveying signals encoding the instructions. Separate instances of these programs can be executed on separate computer systems in keeping with the multi-process methods described above. Thus, although certain steps have been described as being performed by certain devices, software programs, processes, or entities, this need not be the case and a variety of alternative implementations will be understood by those having ordinary skill in the art.

Additionally, those having ordinary skill in the art will readily recognize that the techniques described above can be utilized in a variety of different storage devices and computing systems with variations in, for example, the number of nodes, the type of operation of the computing system, e.g., cluster operation (failover, parallel, etc.), the number and type of shared data resources, and the number of paths between nodes and shared data resources.

FIG. 5 illustrates a block diagram of a typical computer system 500 for implementing embodiments of the systems and methods for storage management. For example, computer system 500 can be an embodiment of one of the previously described cluster nodes. Computer system 500 includes a processor 510 and a memory 520 coupled together by communications bus 505. Processor 510 can be a single processor or a number of individual processors working together. Memory 520 is typically random access memory (RAM), or some other dynamic storage device, and is capable of storing instructions to be executed by the processor, e.g., storage management and I/O software 540. Memory 520 is also used for storing temporary variables or other intermediate information during the execution of instructions by the processor 510.

Those having ordinary skill in the art will readily recognize that the techniques and methods discussed below can be implemented in software using a variety of computer languages, including, for example, traditional computer languages such as assembly language, Pascal, and C; object oriented languages such as C++ and Java; and scripting languages such as Perl and Tcl/Tk. Additionally, software 540 can be provided to the computer system via a variety of computer readable media including electronic media (e.g., flash memory), magnetic storage media (e.g., hard disk 558, a floppy disk, etc.), optical storage media (e.g., CD-ROM 560), and communications media conveying signals encoding the instructions (e.g., via a network coupled to network interface 554).

Computer system 500 may also include devices such as keyboard & mouse 550, SCSI interface 552, network interface 554, graphics & display 556, hard disk 558, and CD-ROM 560, all of which are coupled to processor 510 by communications bus 507. It will be apparent to those having ordinary skill in the art that computer system 500 can also include numerous elements not shown in the figure, such as additional storage devices, communications devices, input devices, and output devices, as illustrated by the ellipsis shown. An example of such an additional computer system device is a fibre channel interface.

In one embodiment, the volume manager software (e.g., volume manager 330 or 430) includes two primary components: a configuration engine and an I/O engine. The configuration engine allows users to create, change, or delete a volume. The I/O engine services I/O to the volume. The entity that manages the configuration engine and the volume metadata 106 is known as the Volume Server (VS) 135. The entity that manages the I/O engine is known as the Volume Owner (VO) 136. A Volume Owner (VO) (e.g., 136A, 136B, and 136C) services I/O requests for a given volume (e.g., 105A, 105B, and 105C, respectively). In one embodiment, a VSVO protocol may be provided to facilitate communication between the Volume Server 135 and Volume Owner(s) 136. The VSVO protocol may provide a level of abstraction between management of volume configuration information and management of volume I/O.

Figure 6:
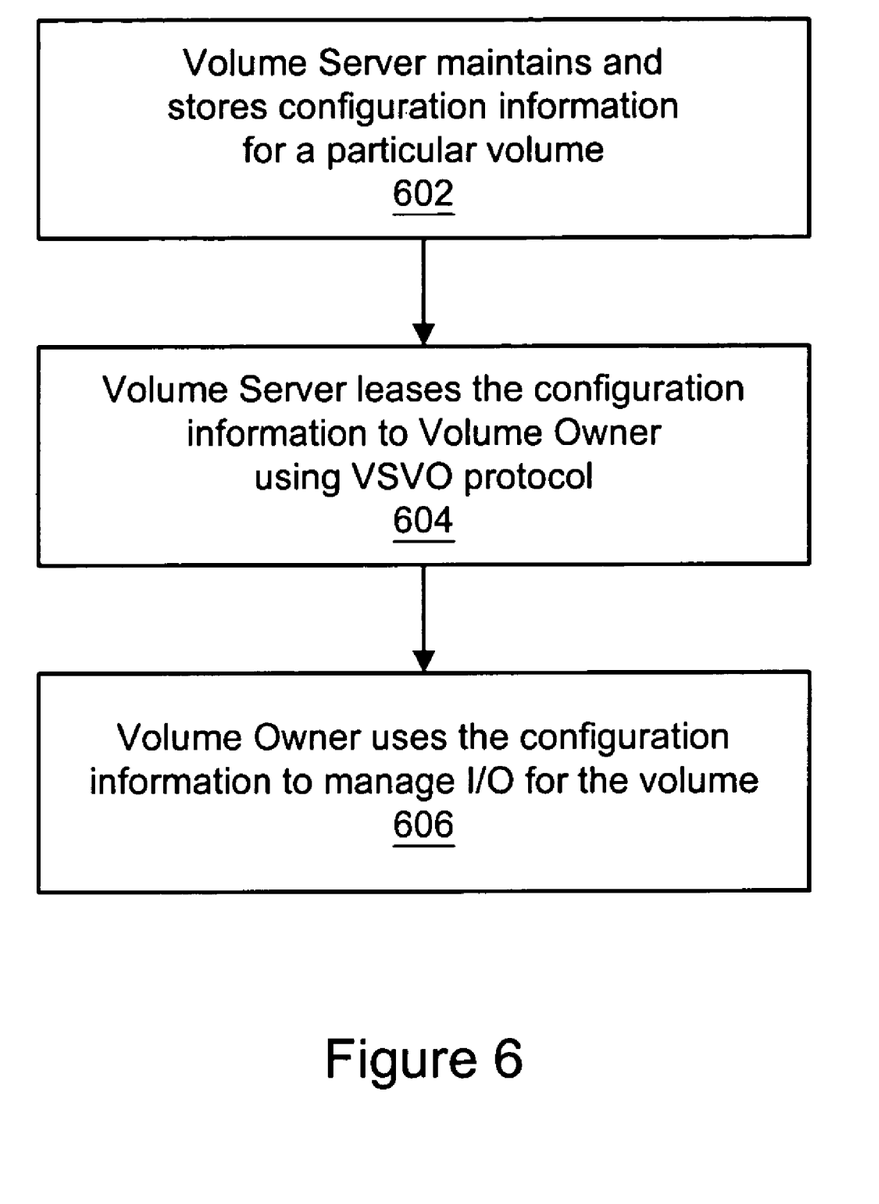
FIG. 6 is a flowchart illustrating a method for using a VSVO protocol to facilitate communication between a volume server and a volume owner according to one embodiment.

FIG. 6 is a flowchart illustrating a method for using a VSVO protocol to facilitate communication between a Volume Server 135 and a Volume Owner 136 according to one embodiment. In 602, a Volume Server 135 may maintain and store configuration information 106 for a particular volume 105.

In 604, the Volume Server 135 may lease the configuration information to a Volume Owner 136 using a communications protocol (i.e., a VSVO protocol), thereby creating a lease. In other words, the Volume Server 135 may delegate a volume 105 (and its associated configuration data 106) to a Volume Owner 136.

In 606, the Volume Owner 136 may use the configuration information 106 to manage input/output (I/O) for the volume 105. The VSVO protocol may facilitate the exchange of configuration information 106, such as information regarding volume leases, among the Volume Server 135 and Volume Owner(s) 136.

In various embodiments, the Volume Server 135 and Volume Owner(s) 136 may or may not reside on the same computer system. In one embodiment, the Volume Owner(s) 136 may reside in a switch (e.g., switch 160), where it regulates traffic to and from a given volume 105. In one embodiment, there is one and only one Volume Owner 136 for a given volume 105. In one embodiment, a Volume Owner 136 may be the owner of multiple volumes 105. In one embodiment, the VSVO protocol is operable as a connection-oriented or connectionless protocol. In one embodiment, the VSVO protocol provides full access control for a given volume 105 to the Volume Owner 136.

In one embodiment, the VSVO protocol provides a VSVO protocol API which includes a plurality of operations to facilitate management of leases and communication among the Volume Server 135 and Volume Owner(s) 136. In one embodiment, the Volume Server 135 provides a set of "ioctl" (I/O Control) functions to support the VSVO protocol API. In one embodiment, the device "/dev/vx/protocol" may be used with these ioctls. In one embodiment, the information can be exchanged over a network (e.g., using TCP/IP packets, as datagrams, between the Volume Server and the Volume Owner(s)

In one embodiment, the VSVO protocol may provide an operation to open a volume, if given a globally unique identifier (GUID) for the volume. It is expected that either the standard system call (open) or this operation should be used, but mixing standard system calls VSVO protocol functions to open or close a volume may result in unexpected behavior. In one embodiment, when a volume is opened using this operation, a file descriptor is not returned. Thus, the operating system may not have knowledge that a given volume has been opened. If the process that opened a volume exits without closing the volume (e.g., if it terminates prematurely), the volume may remain open indefinitely.

In one embodiment, the VSVO protocol may provide an operation to close the volume if given a globally unique identifier for the volume. In one embodiment, all volumes may be closed upon closing of the /dev/vx/protocol device.

In one embodiment, the VSVO protocol may provide an operation to get the configuration information for a particular volume. If the volume has already been leased to a Volume Owner, this operation may return the Volume Owner ID. If the volume is available for lease and a user-specified configuration length is zero, then the operation may return the configuration length. If the volume is available for lease and the user has provided the configuration length and buffer, then the operation may return the configuration information. The configuration information may include information such as an identifier of the volume for which the data is requested, the ID of the requesting Volume Owner, a status of the Volume Owner lessee, a time stamp for the response, the remaining lease duration, one or more diagnostic flags, and other relevant configuration data.

In one embodiment, the VSVO protocol may provide an operation to renew or "keep alive" the lease. This operation may typically be initiated by a Volume Owner lessee. The Volume Owner may issue this "keep alive" request prior to the expiration time of the lease. In one embodiment, the Volume Owner may request to renew leases for multiple volumes.

In one embodiment, the VSVO protocol may provide an operation to revoke the lease. This operation may typically be initiated by a Volume Owner lessee who wants to revoke the lease prior to its natural expiration. In other circumstances, a Volume Server may request to revoke a lease.

In one embodiment, the VSVO protocol may provide an operation to set lease parameters. The lease parameters may include the remaining lease time, keep alive interval, remote I/O timeout, etc.

In one embodiment, the VSVO protocol may provide an operation to set I/O statistics information for the volume. This operation may be used to provide compatibility with other system functions and/or proprietary functions (e.g., "vxstat"). A volume statistics ioctl may include information such as a global identifier for the volume, a number of reads, a number of blocks of reads, a total read time, a number of writes, and a number of blocks of writes, a total write time.

In one embodiment, the Volume Server may notify any process using the protocol device about VSVO protocol events such as a volume delegation revoke. The interested process may obtain the notifications using /dev/vx/protocol. Notification records of VSVO protocol events may include information such as the op code of the event, the time at which the event was posted, and the global identifier of the volume associated with the event. In one embodiment, notification codes may include, for example, VOLPROTE_CONFIG_READY, VOLPROTE_REVOKE, VOLPROTE_DELEGABLE, and other suitable codes that may determine the state of the volume(s) in question and the associated action that is being negotiated between the Volume Server and the Volume Client.

For distributed storage management, unique naming of the devices under administration is a critical feature. In one embodiment, a global device naming service (GDNS) provides easy-to-use unique identification of devices to simplify system administration. A GDN (global device name) is a unique device name generated by the global device naming service. To ensure global uniqueness, it is desirable for the global device name to be persistent for each device. Also, it is desirable to co-ordinate global device names across multiple hosts or computing entities (such as switches, or switch blades) which may potentially be using or connected to the device. It is desirable to have a naming scheme which combines the uniqueness of Unique Device Identifiers (UDIDs) and user-friendliness of Enclosure Based Names (EBNs). Furthermore, the GDNS should span across all the hosts or computing entities under administration and all the component software pieces that make centralized storage management possible.

Figure 7:
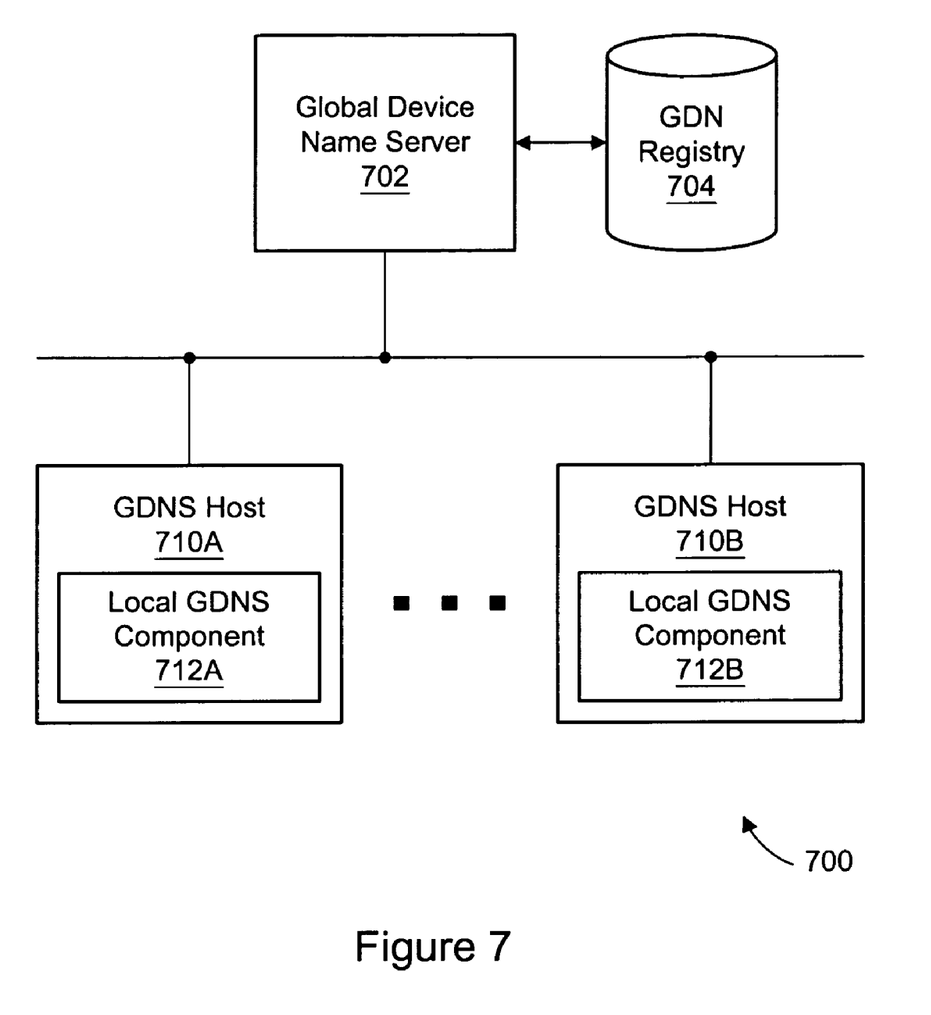
FIG. 7 illustrates components of a global device naming service according to one embodiment.

FIG. 7 illustrates components of a global device naming service 700 according to one embodiment. The global device naming service 700 may include a global device name server (GDN server) 702 which communicates with local GDNS components 712 on respective hosts 710 in a distributed storage management system. In one embodiment, one GDN server 702 may be used to generate global device names by a plurality of hosts 710 in a distributed storage management system. The GDN server 702 may run on one of the hosts.

The GDN server 702 may be coupled to a GDN registry (e.g., a database) 704 for storage of global device names and other relevant information. The GDN server 702 may ensure uniqueness of device names by maintaining a mapping of GDNs to UDIDs in the GDN registry 704. A device can be universally identified using its UDID, provided that a well-known algorithm UDID generation algorithm is used every time and the same UDID is generated every time for a particular device, irrespective of its connectivity.

In one embodiment, the GDN may have following format: <global-device-name>=<enclosure-name>_<virtual-lun-serial-number>. The default enclosure_name may have the following format: <enclosure-name>=<vendor><virtual-cabinet-serial-number>. In one embodiment, an administrator may override the default enclosure name by specifying a user-defined enclosure name. To assist the GDNS, the vendor id and cabinet serial number may be provided at the time of registering the device. The GDN server may generate the virtual-lun-serial-number internally. In one embodiment, re-generation of the virtual serial number may not guarantee the same results and may therefore cause device names to change.

Figure 8:
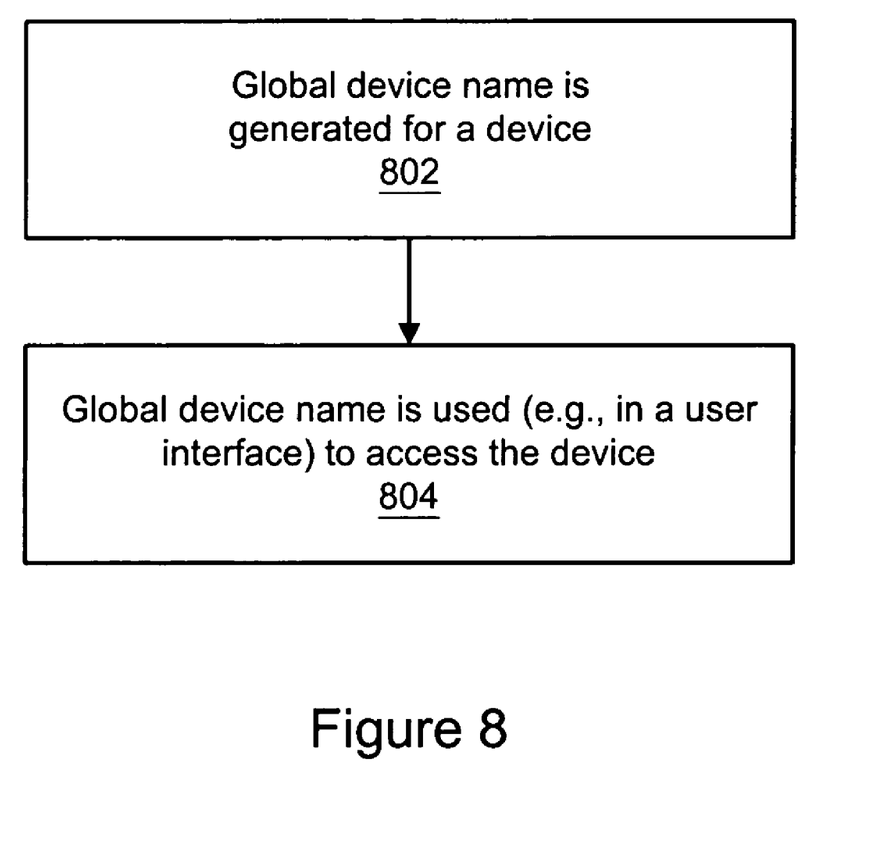
FIG. 8 is a flowchart illustrating a method for generating global device names according to one embodiment.

FIG. 8 is a flowchart illustrating a method for generating global device names according to one embodiment. In 802, a global device name may be generated for a device. The global device name comprises a persistent device name which is unique across the plurality of hosts in the distributed storage management system. For example, the global device name may comprise an enclosure name and a LUN serial number for the device. In 804, the global device name is used (e.g., in a user interface) to access the device. Device access may comprise I/O.

In one embodiment, device registration under GDNS may take place as follows. First, a component on a host may discover the presence of a device. The host may inform the appropriate local GDNS component of the UDID, vendor id, and virtual cabinet serial number of the new device. Second, the local GDNS component may contact the GDN server to register the device. Third, using the UDID of the device, the GDN server will search the global device name registry to determine whether the device is already registered. If the device is not registered, the GDN server may generate a GDN, add the device to the registry, and raise a device addition notification. If the device is already registered, the registration request may be ignored.

In one embodiment, a device name query under GDNS may take place as follows. First a host (which is connected to a device registered with the GDN server) may require the GDN of the device. The host may inform its local GDNS component of the UDID of that device. Second, the local GDNS component may contact the GDN server to obtain the GDN of the device. The GDN of the device may then returned to the requesting host.

In one embodiment, changing an enclosure name under GDNS may take place as follows. First, an administrator (e.g., on a management host) may decide to change a particular enclosure name. Second, the administration software may inform the local GDNS component of the old enclosure name (e.g., vendor id and virtual cabinet number) and new enclosure name. Third, the local GDNS component may contact the GDN server with this information. The GDN server may search the registry for the old enclosure name and then change the enclosure name to the specified new enclosure name. The GDN server may then raise an event for enclosure name change.

In one embodiment, deletion of items under GDNS may take place as follows. First, an administrator may wish to delete an enclosure or device from the registry (e.g., due to device end-of-life). Second, the administration software may contact the local GDNS component with the enclosure name or list of devices to be removed from the registry. Third, the local GDNS component may contact GDN server with this information. The GDN server may delete all device entries belonging to the given enclosure from the device registry database. It may then raise an event for deletion of the device from registry. In one embodiment, if the GDN for a particular device is deleted and the device is registered again, there is no guarantee that the device will be assigned the same GDN.

In one embodiment, a UDID query under GDNS may take place as follows. First, a component sitting on a management host or any host connected to a device may seek the UDID of the device. This component may contact the local GDNS component along with the GDN of the device. Second, the local GDN component may contact GDN the server. The GDN server may search for the GDN in registry and return the associated UDID back to the requesting host.

For proper deployment of GDNS, external modules may be expected to follow certain guidelines. First, at least one or more users of GDNS should be able to generate UDIDs and register the devices using local GDNS interface. Second, the UDIDs to be registered should be generated using a well-known algorithm such that the same UDID is generated for a particular device every time, irrespective of its connectivity. Third, a user of GDNS is expected to use GDNs of devices wherever possible in all its user interfaces (e.g., CLI, GUI, error messages, alerts, etc.).

In one embodiment, GDNS may be used in conjunction with Device Discovery Layer (DDL) for device discovery. DDL may provide an Enclosure-Based Names (EBN) service. In DDL, enclosure names may be stored persistently in a file or on a device, and the LUN numbers may be generated internally by DDL. In a GDN-based implementation, the enclosure name and LUN numbers may generated and persistently stored by the GDN server.

In order to make use of GDNS-provided enclosure names and LUN numbers, the DDL code which generates or uses LUN numbers and manages enclosure names may be abstracted by a device-naming API. DDL may link to a device-naming library which provides this API. The library may also act as a client to the GDN server to obtain device registration services. The device-naming library may itself be able to generate device names which will be unique for that host.

In one embodiment, the overall flow of control using DDL may take place as follows. First, DDL may discovers a device and thereby obtain its UDID, vendor id, and enclosure serial number. Second, DDL may call the device-naming library in order to register the device. Third, the device-naming library may determine whether GDN based naming is expected to be used and whether the GDN server is accessible. If so, then the device-naming library may contact GDN server to register the device. The GDN server may then generate a GDN of the device if necessary, store it in the central GDN repository, and return it to the device-naming library. However, if the GDN server is not accessible, the naming library may generate a device name using a well-known algorithm. However, this device name may not be unique across all the hosts using GDNS. Fourth, the device-naming library will store the device name in a local device-name database. Fifth, the loaded device-naming library, acting as a client to GDN server, may register for the event "event.GDNS.namechange." On such event, it may request DDL to rescan the device-names from the device-naming library. DDL may provide a CLI/API to rescan device-names. Sixth, the DDL rescan may be requested if the GDN server becomes available after being unavailable. Seventh, whenever DDL rescans the GDNs using the naming library, the naming library may query the GDNs of all the UDIDs stored in local GDN database if GDN server is accessible. The returned GDN values may then overwrite the GDN values stored in local database, in case of conflicts. Eighth, after DDL rescans the GDNs, the GDNs will be pushed into the volume manager in the same way EBNs are pushed.

Figure 9:
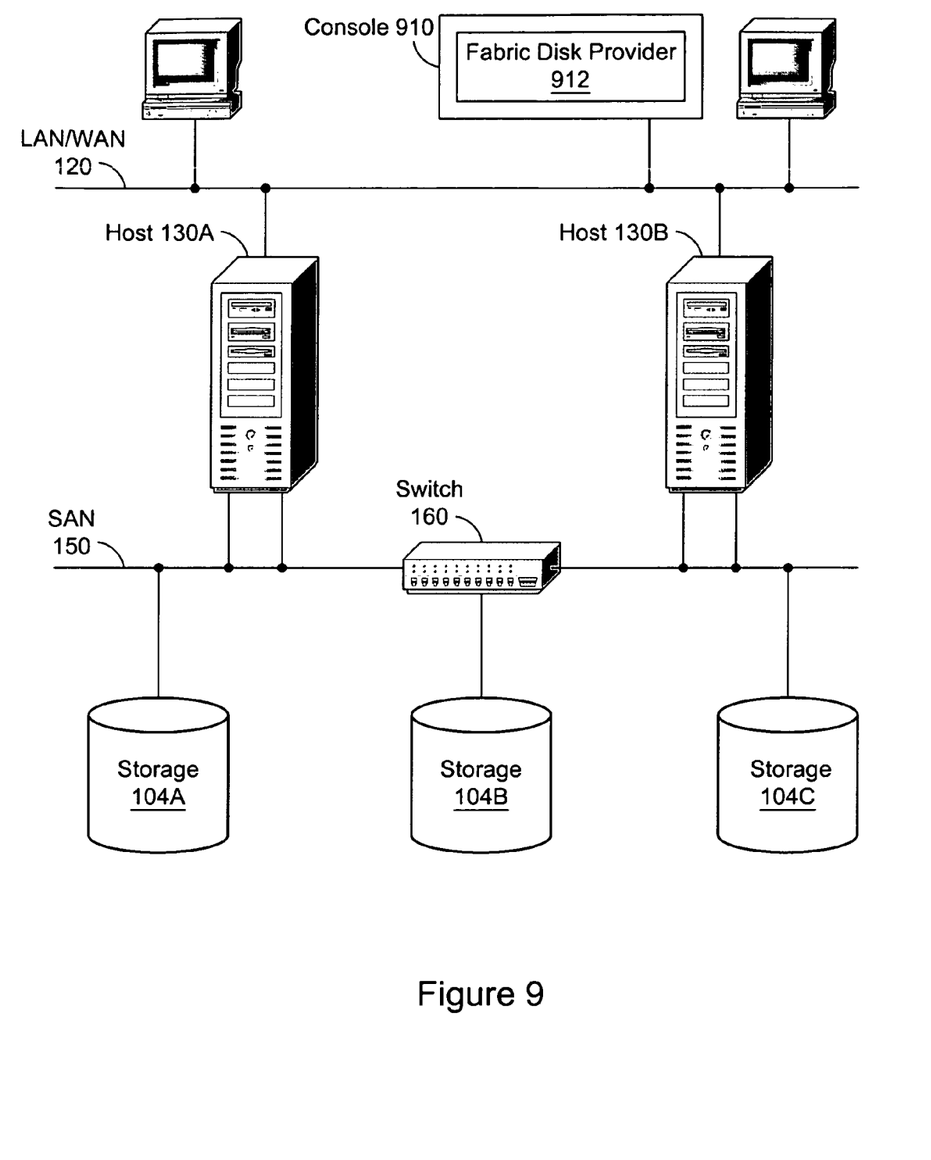
FIG. 9 illustrates consolidated disk fabric information at a management console level according to one embodiment.

FIG. 9 illustrates consolidated disk fabric information at a management console level according to one embodiment. A Fabric Disk (FD) Provider 912 may maintain the consolidated disk fabric information. The disk fabric information may comprise disk fabric objects, their properties, and the relationship or hierarchy among the objects in a disk fabric (e.g., behind a switch 160). The FD Provider may run in a management console 910 (e.g., a Management Server (MS) and/or a Console Server (CS)). An Enterprise Administration (EA) system (e.g., VERITAS Enterprise Administration from VERITAS Software Corporation) may be used as an integration framework. The FD Provider 912 may act like a server for CS clients and the EA system to provide the disk fabric objects.

The FD Provider 912 may read a user-editable configuration file to obtain a list of one or more Volume Server(s) 135. In one embodiment, a secure implementation may require this information to be encoded and accessed with a password via graphical user interfaces. The FD Provider 912 may obtain the disk objects from the Volume Server(s) 135 and consolidate the disk fabric information at the management console 910 level. In one embodiment, a disk object (e.g., of the type vrts_vxvm_disk) may be created for every physical disk 104. If the device has multiple paths, only one disk object may be created. In one embodiment, a property of the disk object may be used to obtain the device path to the disk device 104. This device path may be used to send a SCSI inquiry command and any other device-specific command to the device 104, and the OID and other relevant information may be returned. Every disk object may have the following properties: Fabric ID, Zone Name, LUN Number and OID (Object ID).

In one embodiment, the disk fabric tree maintained by the FD Provider 912 may contain the parent-child relationships among fabric (vrts_fdpr_fdfabric), zone (vrts_fdpr_fdzone), host (vrts_fdpr_fdhost) and addrunit (vrts_fdpr_fdaddrunit) objects. A pair of Fabric-Id and zone name properties may be used to create a vrts_fdpr_fdfabric object and a vrts_fdpr_fdzone object. The Volume Server name may be used to create vrts_fdpr_fdhost objects. The OIDs of disk devices may be used to create vrts_fdpr_fdaddrunit objects. In one embodiment, for each disk object, the FD Provider 912 may obtain the appropriate properties and create the vrts_fdpr_fdfabric object, vrts_fdpr_fdzone object, vrts_fdpr_fdhost object, vrts_fdpr_fdaddrunit object and their parent-child relationships. An .xml file may be used to define the inheritance of FD objects with the original, underlying disk objects maintained by the Volume Server(s) 135.

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system comprising:
   one or more physical storage devices;
   a computer system comprising at least one processor and a memory, wherein the memory stores a volume server which is executable by the at least one processor to manage configuration information for a volume, wherein the volume comprises data stored on the one or more physical storage devices, wherein the configuration information for the volume specifies a logical configuration of the data stored on the one or more physical storage devices; and
   a volume owner, wherein the volume owner is coupled to the one or more physical storage devices over a network;
   wherein the volume server is further executable by the at least one processor to lease the configuration information to the volume owner using a communications protocol, wherein leasing the configuration information creates a lease of the configuration information to the volume owner, wherein the lease comprises a specific duration of time for exclusive management of input/output (I/O) for the volume by the volume owner, wherein the communications protocol comprises a plurality of operations for management of the lease; and
   wherein the volume owner is configured to use the logical configuration specified in the configuration information to manage I/O for the volume, and wherein the volume owner is configured to use the logical configuration specified in the configuration information to send I/O requests over the network to the one or more physical storage devices.

2. The system of claim 1,
   wherein the volume server comprises a configuration engine;
   wherein the volume owner comprises an I/O engine.

3. The system of claim 1,
   wherein the plurality of operations comprises an operation to open the volume when given a globally unique identifier for the volume.

4. The system of claim 1,
   wherein the plurality of operations comprises an operation to close the volume when given a globally unique identifier for the volume.

5. The system of claim 1,
   wherein the plurality of operations comprises an operation to get the configuration information.

6. The system of claim 1,
   wherein the plurality of operations comprises an operation to renew the lease.

7. The system of claim 1,
wherein the plurality of operations comprises an operation to revoke the lease.

8. The system of claim 1,
wherein the plurality of operations comprises an operation to set lease parameters.

9. The system of claim 1,
wherein the plurality of operations comprises an operation to set I/O statistics information for the volume.

10. A method comprising:
a volume server storing configuration information for a volume, wherein the volume comprises data stored on one or more physical storage devices, wherein the configuration information for the volume specifies a logical configuration of the data stored on the one or more physical storage devices;
the volume server leasing the configuration information to a volume owner using a communications protocol, wherein leasing the configuration information creates a lease of the configuration information to the volume owner, wherein the lease comprises a specific duration of time for exclusive management of input/output (I/O) for the volume by the volume owner, wherein the communications protocol comprises a plurality of operations for management of the lease; and
the volume owner using the logical configuration specified in the configuration information to manage I/O for the volume and send I/O requests over a network to the one or more physical storage devices.

11. The method of claim 10,
wherein the volume server comprises a configuration engine;
wherein the volume owner comprises an I/O engine.

12. The method of claim 10,
wherein the plurality of operations comprises an operation to open the volume when given a globally unique identifier for the volume.

13. The method of claim 10,
wherein the plurality of operations comprises an operation to close the volume when given a globally unique identifier for the volume.

14. The method of claim 10,
wherein the plurality of operations comprises an operation to get the configuration information.

15. The method of claim 10,
wherein the plurality of operations comprises an operation to renew the lease.

16. The method of claim 10,
wherein the plurality of operations comprises an operation to revoke the lease.

17. The method of claim 10,
wherein the plurality of operations comprises an operation to set lease parameters.

18. The method of claim 10,
wherein the plurality of operations comprises an operation to set I/O statistics information for the volume.

19. A computer-accessible storage medium comprising program instructions, wherein the program instructions are computer-executable to perform:
storing configuration information for a volume at a volume server, wherein the volume comprises data stored on one or more physical storage devices, wherein the configuration information for the volume specifies a logical configuration of the data stored on the one or more physical storage devices;
leasing the configuration information from the volume server to a volume owner using a communications protocol, wherein leasing the configuration information creates a lease of the configuration information to the volume owner, wherein the lease comprises a specific duration of time for exclusive management of input/output (I/O) for the volume by the volume owner wherein the communications protocol comprises a plurality of operations for management of the lease; and
using the logical configuration specified in the configuration information at the volume owner to manage I/O for the volume and send I/O requests over a network to the one or more physical storage devices.

20. The computer-accessible storage medium of claim 19,
wherein the volume server comprises a configuration engine;
wherein the volume owner comprises an I/O engine.

21. The computer-accessible storage medium of claim 19,
wherein the plurality of operations comprises an operation to open the volume when given a globally unique identifier for the volume.

22. The computer-accessible storage medium of claim 19,
wherein the plurality of operations comprises an operation to close the volume when given a globally unique identifier for the volume.

23. The computer-accessible storage medium of claim 19,
wherein the plurality of operations comprises an operation to get the configuration information.

24. The computer-accessible storage medium of claim 19,
wherein the plurality of operations comprises an operation to renew the lease.

25. The computer-accessible storage medium of claim 19,
wherein the plurality of operations comprises an operation to revoke the lease.

26. The computer-accessible storage medium of claim 19,
wherein the plurality of operations comprises an operation to set lease parameters.

27. The computer-accessible storage medium of claim 19,
wherein the plurality of operations comprises an operation to set I/O statistics information for the volume.

28. A system comprising:
means for storing configuration information for a volume at a volume server, wherein the volume comprises data stored on one or more physical storage devices, wherein the configuration information for the volume specifies a logical configuration of the data stored on the one or more physical storage devices;
means for leasing the configuration information from the volume server to a volume owner using a communications protocol, wherein leasing the configuration information creates a lease of the configuration information to the volume owner, wherein the lease comprises a specific duration of time for exclusive management of input/output (I/O) for the volume by the volume owner, wherein the communications protocol comprises a plurality of operations for management of the lease; and
means for using the logical configuration specified in the configuration information at the volume owner to manage I/O for the volume and send I/O requests over a network to the one or more physical storage devices.

* * * * *